(12) United States Patent
Fröjdh et al.

(10) Patent No.: US 8,965,067 B2
(45) Date of Patent: Feb. 24, 2015

(54) FACE DATA ACQUIRER, END USER VIDEO CONFERENCE DEVICE, SERVER, METHOD, COMPUTER PROGRAM AND COMPUTER PROGRAM PRODUCT FOR EXTRACTING FACE DATA

(75) Inventors: Per Fröjdh, Stockholm (SE); Jacob Ström, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 86 days.

(21) Appl. No.: 13/824,822

(22) PCT Filed: Oct. 28, 2010

(86) PCT No.: PCT/SE2010/051174
§ 371 (c)(1),
(2), (4) Date: Mar. 18, 2013

(87) PCT Pub. No.: WO2012/057665
PCT Pub. Date: May 3, 2012

(65) Prior Publication Data
US 2013/0177219 A1   Jul. 11, 2013

(51) Int. Cl.
*G06K 9/00* (2006.01)
*G06F 17/30* (2006.01)
*H04N 7/14* (2006.01)
*H04N 7/15* (2006.01)
*G06K 9/62* (2006.01)

(52) U.S. Cl.
CPC ...... *G06K 9/00268* (2013.01); *G06F 17/30793* (2013.01); *H04N 7/147* (2013.01); *H04N 7/15* (2013.01); *G06K 9/00926* (2013.01); *G06K 9/6255* (2013.01)

USPC .......................................................... 382/118

(58) Field of Classification Search
None
See application file for complete search history.

(56) References Cited

U.S. PATENT DOCUMENTS

| | | | | |
|---|---|---|---|---|
| 7,539,556 | B2 * | 5/2009 | Oohashi | 700/245 |
| 7,847,815 | B2 * | 12/2010 | Patel et al. | 348/14.08 |
| 8,396,264 | B2 * | 3/2013 | Moriyama et al. | 382/118 |
| 2006/0259755 | A1 * | 11/2006 | Kenoyer | 713/1 |

(Continued)

FOREIGN PATENT DOCUMENTS

| | | |
|---|---|---|
| EP | 1998286 A1 | 12/2008 |
| WO | WO 2008/045153 A2 | 4/2008 |

OTHER PUBLICATIONS

International Search Report, PCT/SE2010/051174, Jun. 29, 2011.
Written Opinion of the International Searching Authority, PCT/SE2010/051174, Oct. 2, 2012.

(Continued)

*Primary Examiner* — Daniel Mariam
(74) *Attorney, Agent, or Firm* — Myers Bigel Sibley & Sajovec, P.A.

(57) ABSTRACT

A face data acquirer includes an image capture module arranged to capture an image from a video stream of a video conference. A face detection module is arranged to determine a subset of the image, the subset representing a face. An identity acquisition module is arranged to acquire an identity of a video conference participant coupled to the face represented by the subset of the image. A face extraction module is arranged to extract face data from the subset of the image and to determine whether to store the extracted face data for subsequent face recognition. A corresponding end user video conference device, server, method, computer program and computer program product are also provided.

20 Claims, 5 Drawing Sheets

(56) References Cited

U.S. PATENT DOCUMENTS

2009/0060295 A1* 3/2009 Inoue et al. .................. 382/118
2010/0149305 A1 6/2010 Catchpole et al.

OTHER PUBLICATIONS

International Preliminary Report on Patentability, PCT/SE2010/051174, Dec. 20, 2012.

* cited by examiner

FACE DATA ACQUIRER, END USER VIDEO CONFERENCE DEVICE, SERVER, METHOD, COMPUTER PROGRAM AND COMPUTER PROGRAM PRODUCT FOR EXTRACTING FACE DATA

CROSS REFERENCE TO RELATED APPLICATION

This application is a 35 U.S.C. §371 national stage application of PCT International Application No. PCT/SE2010/051174 filed on 28 Oct. 2010, the disclosure and content of which is incorporated by reference herein in its entirety. The above-referenced PCT International Application was published in the English language as International Publication No. WO 2012/057665 A1 on 3 May 2012.

TECHNICAL FIELD

The invention relates to extracting face data for subsequent for subsequent face recognition.

BACKGROUND

Face recognition is continuously receiving increased attention. This is due to improved recognition technologies and increased use of digital imaging. For example, face recognition can be used to identify people in snap shots or in video conferences.

However, in order to be able to identify faces, sufficient face data must be available. Typically at least a handful images are required for acceptable accuracy of face recognition.

In the prior art, users have had to indicate the identity of faces in images manually to obtain face data until face data from a sufficient number of faces are obtained. This is a tedious and cumbersome process which requires time and effort from the user.

Furthermore, even if a sufficient amount of face data is stored, people may change their appearance by choice or e.g. by aging, whereby the face data may become obsolete. There is no known way to automatically update face data over time

SUMMARY

An object of the invention is to automate the collection of face data to be used for face recognition.

A first aspect is a face data acquirer comprising: an image capture module arranged to capture an image from a video stream of a video conference; a face detection module arranged to determine a subset of the image, the subset representing a face; an identity acquisition module arranged to acquire an identity of a video conference participant coupled to the face represented by the subset of the image; and a face extraction module arranged to extract face data from the subset of the image and to determine whether to store the extracted face data for subsequent face recognition.

By using image data from a video conference, the face data is automatically associated with an identity and can be stored for subsequent face recognition. This allows face data to be collected without user involvement and effort. Moreover, face data can be updated over time, reflecting a change in appearance of the face.

The image analysis module may be arranged to determine to store the extracted face when an accuracy of face detection is determined to be improved when the extracted face data is stored compared to refraining from storing the extracted face data. In other words, only if the extracted face data contributes to an improved face detection accuracy is the extracted face data stored. This prevents storing new extracted face data that in effect does not contribute to an improved face recognition.

The image analysis module may be arranged to determine to store the extracted face data when a measurement of difference of the extracted face data compared to a set of previously stored extracted face data for the same identity is greater than a threshold value. In other words, if the current face is sufficiently different from the previously stored faces, it should be stored. The reason for this is that later face recognition is more accurate if it is based on face data which is captured from images of varying angles, lighting conditions, etc.

The image analysis module may be arranged to determine to store the extracted face data when a measurement of difference of lighting or contrast conditions in the image compared to a set of previously stored extracted face data for the same identity is greater than a threshold value. In other words, when the lighting or contrast of the whole image is sufficiently different from the previously stored images, the face data is stored.

The image analysis module may be arranged to determine to store the extracted face data when a measurement of difference of lighting or contrast conditions in the subset of the image compared to a set of previously stored extracted face data for the same identity is greater than a threshold value. In other words, when the lighting or contrast of the face is sufficiently different from the previously stored images, the face data is stored.

The image analysis module may be arranged to determine to refrain from storing the extracted face data when it is determined that the face represented in the subset of the image is looking away from a camera used to obtain the image. Data of a face looking away is unlikely to contribute to better face recognition The image analysis module may be arranged to determine to refrain from storing the extracted face data when it is determined that the quality of the image is low, e.g. due to packet losses. Video conferences often use packet based communication, e.g. UDP, due to a desire to reduce latency in communication. Since such packet based communication is often used, packet losses do occasionally occur. If the captured image is an image with one or more lost packets, the quality of the image is quite low, whereby the image is not ideal to be used for subsequent face recognition.

A second aspect is an end user video conference device comprising the face data acquirer according to the first aspect.

The end user video conference device may comprise a storage module arranged to send a message to store the extracted face data in a storage device. In other words, the end user video conference device instructs another entity, such as a server, to store the face data.

The end user video conference device may comprise a storage device arranged to store the extracted face data. In other words, the face data can be stored locally in the end user video conference device.

The end user video conference device may comprise a face recognition device arranged to determine an identity of a face represented in a face recognition image using the extracted face data stored in the storage device. This allows local face recognition to be performed.

The end user video conference device may further comprise a face signature generator arranged to generate a face signature for the identity using the extracted face data in the storage device, wherein the face signature is a set of data being sufficient to allow a face recognition device to recognise a face coupled to the identity in a face recognition image.

A third aspect is a server comprising the face data acquirer according to the first aspect.

The server may comprise a storage device for storing the extracted face data for subsequent face recognition.

The server may comprise a face recognition device arranged to determine an identity of a face represented in a face recognition image using the extracted face data stored in the storage device.

A fourth aspect is a method performed in a face data acquirer comprising: capturing an image from a video stream of a video conference; determining a subset of the image, the subset representing a face; acquiring an identity of a video conference participant coupled to the face represented by the subset of the image; extracting face data from the subset of the image; and determining whether to store the extracted face data for subsequent face recognition.

The method may further comprise effecting storage of the extracted face data in a storage device.

The method may further comprise determining an identity of a face represented in a face recognition image using the extracted face data stored in the storage device.

A fifth aspect is a computer program for a face acquisition device, the computer program comprising computer program code which, when run on the face acquisition device, causes the face acquirer to perform the steps of: capturing an image from a video stream of a video conference; determining a subset of the image representing a face; acquiring an identity of a video conference participant coupled to the face represented by the subset of the image; extracting face data from the subset of the image; and determining whether to store the extracted face data for subsequent face recognition.

A sixth aspect is a computer program product comprising a computer program according to the fifth aspect and a computer readable means on which the computer program is stored.

It is to be noted that any feature of the first, second, third, fourth and fifth aspects may, where appropriate, be applied to any other of these aspects.

Generally, all terms used in the application are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
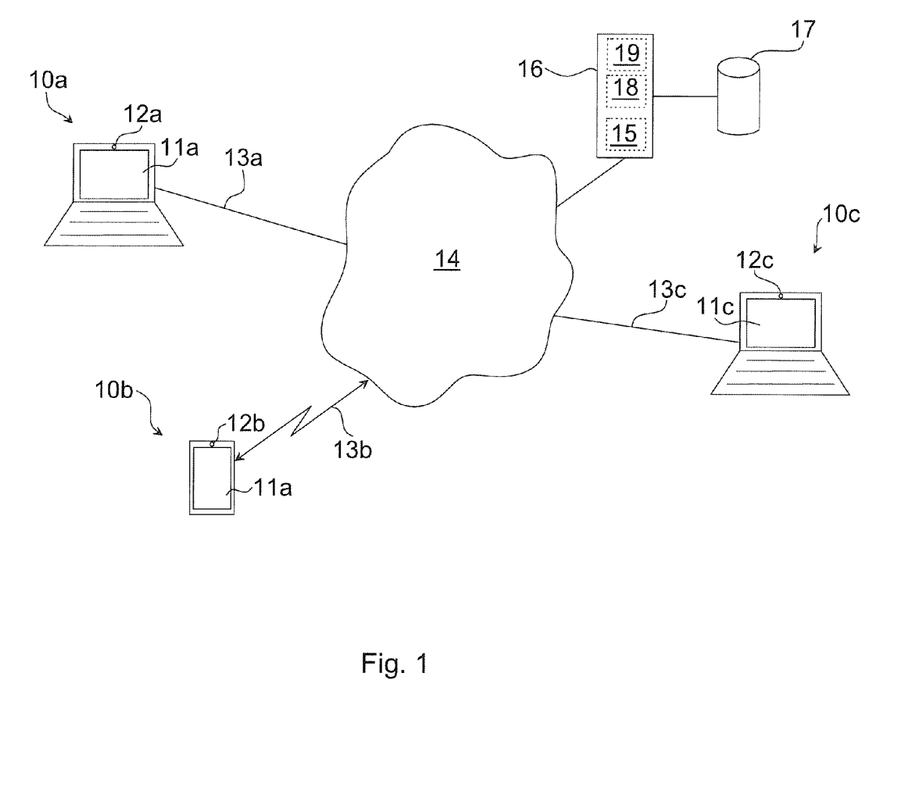
FIG. 1 is a schematic diagram illustrating a video conference system where embodiments can be applied.

FIG. 1 is a schematic diagram illustrating a video conference system where embodiments can be used. End user video conference devices 10a-c are connected with each other via a network 14, such as a local area network or a wide area network, e.g. Internet. Each end user video conference device comprises a respective camera 12a-c and a respective display 11a-c. While the cameras 12a-c are shown as embedded in respective end user video conference device 10a-c, the cameras 12a-c could equally well be separate devices connected to the respective end user video conference device 10a-c. The end user video conference devices 10a-c can for example be laptop or desktop computers, mobile phones, smart phones and/or personal digital assistants (PDAs).

Each end user video conference device 10a-c has a respective connection 13a-c to the network 14.

A server 16 is also connected to the network. The server can be configured to oversee any video conferences, facilitating setup and teardowns, providing directory services, etc. The server 16 can be any suitable computer capable of performing the tasks as described herein. For example, the server can be a computer running an operating system such as Linux, Microsoft Windows, Apple Mac OS, UNIX variants, etc. The server 16 comprises a processor 18 (e.g. a CPU), primary memory 19, such a RAM and a storage device 17 providing persistent storage, such as magnetic storage, solid state storage, optical storage or any combination of these. The server also comprises an I/O interface 15 for connecting to the network 14, and thereby providing connectivity to the end user video conference devices 10a-c.

Using the system of FIG. 1, two or more end user video conference devices 10a-c can set up video conferences with each other. In other words, video conferences with two or more simultaneous parties can be set up in this system. A face data acquirer is implemented in one or more of the end user video conference devices 10a-c and/or the server 16, as will be explained in further detail below. The face data acquirer obtains face data from the video conference for use in subsequent face recognition.

Figure 2:
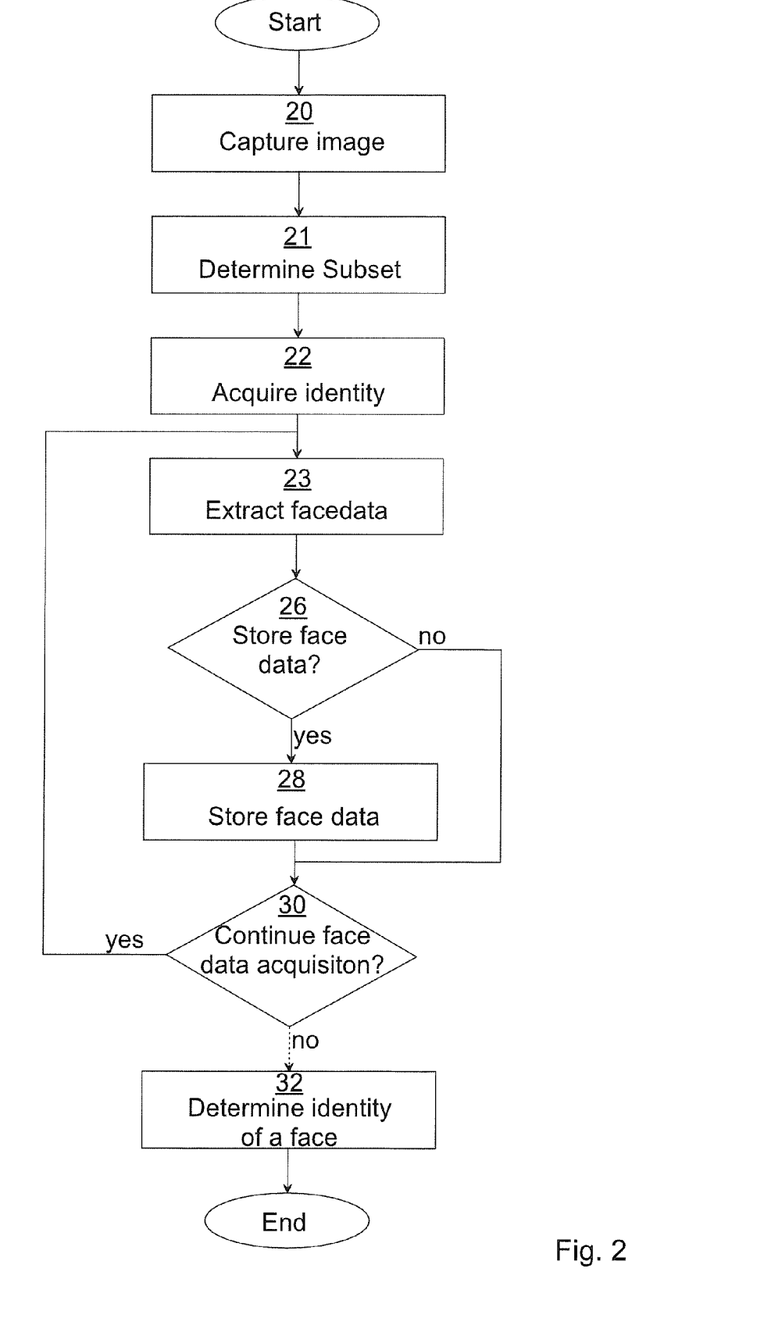
FIG. 2 is a flow chart illustrating a method of embodiments described herein.

FIG. 2 is a flow chart illustrating a method of embodiments described herein. The method is performed in a face recognition device at a time when a video conference is in progress. It is to be noted that this process can occur for one or more of the video conference participants simultaneously.

In an initial capture image step 20, an image from a video stream of the video conference is captured. The image is represented by a matrix of pixels, as known in the art per se, and is encoded using any suitable encoding scheme. The original source of the image is a digital camera or similar used for the video conference.

In a determine subset step 21, a subset of the image is determined. In this case, the subset represents a face. The subset may for example be a closed loop encompassing the face in the image or a rectangular subset of the image.

In the acquire identity step 22, an identity of a video conference participant coupled to the face represented by the subset of the image is acquired. This can for example be done by retrieving information from the video conference software in the end user video conference device or server to get the participant information. In other words, it is the identity of the user which is connected to the end user video conference device with the camera that generates the image which is applicable.

In an extract face data step 23, face data is extracted from the subset of the image. This face data is of a format which could later be used for face recognition. For example, the face data could simply be a lower resolution image of the subset of the image, as is explained in more detail below.

In a conditional store face data step 26, it is determined whether to store the extracted face data or whether the data should be discarded. Optionally, the extract face data step 23 is only performed if it is determined that the face data should be stored. Now a number of examples will be presented of how it is determined whether or not to store the face data. The examples may be implemented exclusively or in any combination of two or more examples.

In a first example, the face data is stored when a measurement of difference of the extracted face data compared to a set of previously stored extracted face data for the same identity is greater than a threshold value. In other words, if the current face is sufficiently different from a set of previously stored faces, it should be stored. The reason for this is that later face recognition is more accurate if it is based on face data which is captured from images of varying angles, lighting conditions, etc. The set of previously stored faces can be all previously stored data of faces or a subset of these images.

In a second example, the face data is stored when a measurement of difference of lighting or contrast conditions in the image compared to a set of previously stored extracted face data for the same identity is greater than a threshold value. In other words, when the lighting or contrast of the whole image is sufficiently different from the previously stored images, the face data is stored.

In a third example, the face data is stored when a measurement of difference of lighting or contrast conditions in the subset of the image compared to a set of previously stored extracted face data for the same identity is greater than a threshold value. In other words, when the lighting or contrast of the face data is sufficiently different from the previously stored images, the face data is stored.

In a fourth example, the face data is discarded when it is determined that the face represented in the subset of the image is looking away from a camera used to obtain the image. Data of a face looking away is unlikely to contribute to better face recognition.

In a fifth example, the face data is discarded when it is determined that the quality of the image is low, e.g. due to packet losses. Video conferences often use packet based communication, e.g. UDP, due to a desire to reduce latency in communication. Since such packet based communication is often used, packet losses do occasionally occur. If the captured image is an image with one or more lost packets, the quality of the image is quite low, whereby the image is not ideal to be used for subsequent face recognition.

In a sixth example, the face data is discarded when it is determined that the system would perform worse if the extracted face data is included, compared to not including it. This can be done by evaluating the performance with and without the added face data item. For instance, assume that there are five images of user X in the system already: A, B, C, D and E. The system can then determine its current performance by removing A from the system and try to recognise A using B, C, D and E. Then it can remove B and try to recognize B using A, C, D and E and so forth. Assume all images but C and E are correctly recognized. The accuracy is then 3 out of 5 or 60 percent. Now assume we have a set of new extracted face data F available. We can now evaluate how the system would perform if all images A-F were available. Again, A would be taken out, and the system would try to recognize A using B-F. Then B would be taken out, and so forth. Perhaps the system would now be able to recognize all images except E. Then the performance would be 5 out of 6, or 83 percent. Since this accuracy is higher than the accuracy without the new extracted face data, which was 60 percent, it is determined that image F was beneficial for the purpose of identifying person X. However, if the accuracy would have decreased or stayed the same, extracted face data F would be rejected.

Such a difference between faces can for instance be calculated in the following way. First, the relevant portions of the image (i.e., the part of the image containing the face) must be identified. This is done using a face detection system, such as the one described by Viola and Jones [1]. Such a face detection system typically first determines a subset of an image using a rectangular frame around the area believed by the method to be the face. Face data can then be extracted using this rectangular frame by sampling the image to a fixed size, for example 24×24 pixels, and converting to grey scale. This 24×24 pixel grey scale image now represents extracted face data and can now be compared to similarly subsampled versions of the previously obtained face images for the same individual. In one embodiment, the comparison involves summing the squared difference of the grey scale value in each of the 24×24 pixels. The resulting sum can be used as a measure of how similar the two images are. In this manner the summed squared difference (SSD) value can be calculated between the new face image and all previous images. If the SSD value is larger than a predetermined threshold for all previous images, the face image is selected. Thus, if the smallest SSD value is larger than a certain threshold, the face image is selected.

In an alternate embodiment, the 24×24 pixel image is further processed before the SSD value is calculated. In this case, the average value of the grey scale value is calculated and removed from the image. This is done to exclude new images that only differ from previous images in light intensity, not in light direction. In yet another embodiment, the average is removed, but then the standard deviation of the grey scale value is also calculated, and the image is divided by this factor so that the resulting image standard deviation is constant, for instance equal to 1.0. This is done to exclude new images that only differ from previous images in contrast, but not in light direction. In yet another embodiment the 24×24 pixel is smoothed by a Gaussian filter before the SSD value is calculated. This is done to make the method less dependent upon small shifts in the face detection frame.

While the face detection method described by Viola and Jones [1] typically works well, the frame around the face is sometimes not accurately determined. For instance, sometimes the frame is too far to the left, whereby the face in the 24×24 image will be too far to the right, and not in the centre of the image. This will result in an SSD value that is quite high even though the faces may be very similar. Therefore, in another embodiment of the invention, an extra step called face normalization is inserted between the face detection and the subsampling to the 24×24 pixel image. This face normalization can be done using the method described by Cootes et al. [2] in subsection 3.3 and shown in image 12. By setting the vector b_s in equation (5) to zero, the shape can be normalized to a neutral shape. In this neutral shape, the left eye is always in the same position in the image, the mouth is always in the same position in the image etc. This shape free image can now be subsampled to 24×24 pixels for comparison.

In yet another embodiment, the SSD value is also compared to an upper threshold. If the SSD value is higher than this upper threshold, the face image is not selected. This is to avoid selecting images that arise from errors in the face-detection step (such as described in [1]) or in the face normalization step (such as described in [2]). As an example, if the face-detection step malfunctions and selects part of the background as the face, then hopefully the SSD value will be higher than if a regular face was found. In this way, by comparing against the second threshold, some false face candidates can be removed.

If it is determined that the face data is to be stored, the method continues to a store face data step 28. Otherwise, if the face data is to be discarded, the method continues to a conditional continue face data acquisition step 30.

In the store face data step 28, the face data is stored in a storage device in the end user video conference device and/or the server.

In the conditional continue face data acquisition step 30, it is determined whether to continue face data acquisition or not. One reason not to continue can for example be that the video conference has ended. Another reason not to continue can be that a sufficient amount of face data is stored. When a large number of face data sets are stored, e.g. from about 50 to 100 images, additional face data is unlikely to provide a base for better face recognition. Furthermore, the larger number of face data sets to analyse during face recognition, the larger computation is required, increasing resource requirements and/or face recognition times.

If it is determined to continue the face data acquisition, the method continues to the extract face data step 23. Otherwise, the method eventually continues to a determine identity of a face step 32.

In the determine identity of a face step 32, the actual face recognition is performed. The face recognition is performed using the previously stored face data. Typically, a number of sets of face data are required for the face recognition to be acceptably accurate. For example, at the time of filing this application, it is desired to have at least about five sets of face data obtained from the same number of captured images, for the face recognition to be acceptably accurate. This step is performed at a later stage than the previous steps. Optionally, this step is performed in parallel with the previous steps. Moreover, this step can be performed in the same or a different physical device as for the previous steps.

Optionally, the determine identity of a face step 32 is repeated. After this step, the method ends.

Figure 7:
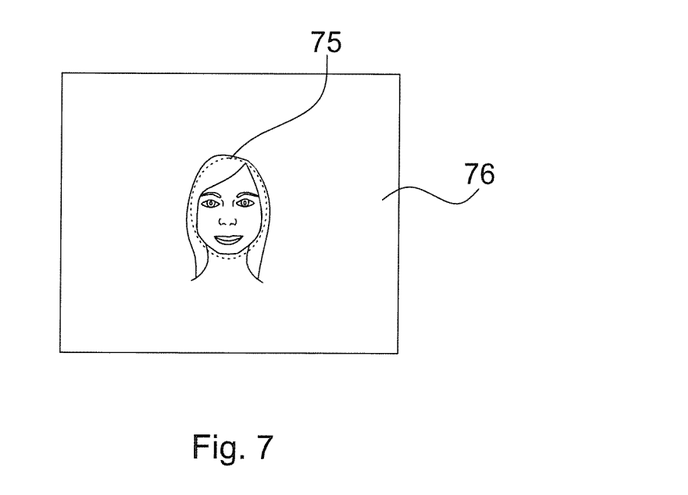
FIG. 7 is a schematic diagram showing an image captured from a video conference.

FIG. 7 is a schematic diagram showing an image 76 captured from a video conference. Within the image 76 there is a subset 75 of the image which corresponds to a face. The subset can be defined by an outline following the face, or it can optionally be a rectangular subset which envelopes the face. The subset 75 of the image can be used to extract face data which can later be used for face recognition.

Figure 3:
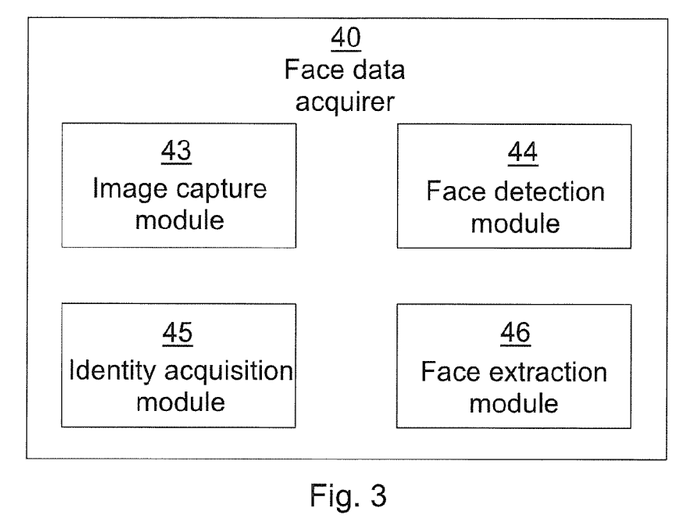
FIG. 3 is a schematic diagram showing functional modules of a face data acquirer included in end user video conference device and/or server of FIG. 1, FIG. 4 schematically shows an embodiment of one or more of the end user video conference device of FIG. 1, FIGS. 5a-c are a schematic diagram showing various configurations for face data acquisition.

FIG. 3 is a schematic diagram showing functional modules of a face data acquirer included in end user video conference device and/or server of FIG. 1. The face data acquirer is a device or software package capable of extracting face data from a video conference image and to associate the face data with an identity, such that the face data can later be used in face recognition.

The modules can be implemented using software such as a computer program executing in the end user video conference device and/or server. All modules depend on an execution environment (not shown) which utilises a controller 18, 60 and optionally a computer program product 17/62 and a I/O interface 15/64.

An image capture module 43 is arranged to capture an image, such as the image 76 shown in FIG. 7, from a video stream of a video conference. This module corresponds to step 20 of FIG. 2.

A face detection module 44 is arranged to determine the subset 75 of the image 76 (FIG. 7), where the subset represents a face. This module corresponds to step 21 of the method disclosed in FIG. 2.

An identity acquisition module 45 is arranged to acquire an identity of a video conference participant coupled to the face represented by the subset 75 of the image 76. This module corresponds to step 22 of FIG. 2.

A face extraction module 46 is arranged to extract face data from the subset 75 of the image 76 and to determine whether to store the extracted face data for subsequent face recognition. This module corresponds to step 23 of FIG. 2.

Figure 4:
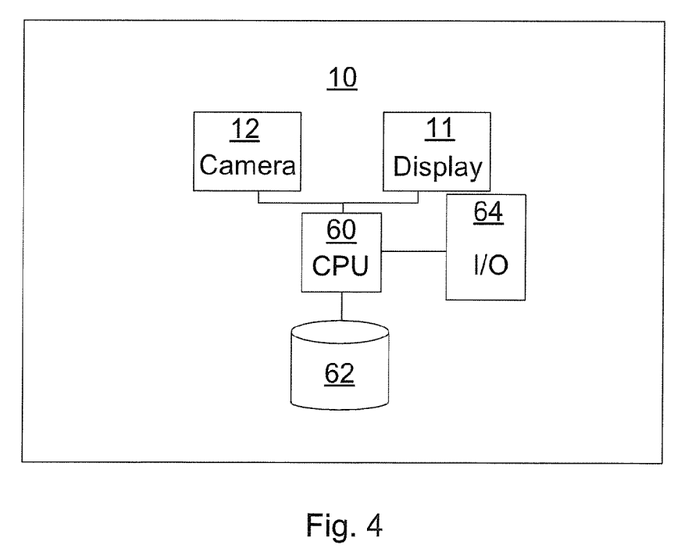

FIG. 4 schematically shows an embodiment of one or more of an end user video conference device 10. The end user video conference device corresponds to any of the end user video conference devices 10a-c of FIG. 1, and the components of FIG. 4 correspond, where applicable, to components of the end user video conference devices 10a-c of FIG. 1 without the end user video conference device identification suffix letter (a, b or c). A controller 60 is provided using any suitable central processing unit (CPU), microcontroller, digital signal processor (DSP), etc., capable of executing software instructions stored in a computer program product 62, e.g. in the form of a memory. The computer program product 62 can be a memory or any combination of read and write memory (RAM) and read only memory (ROM). The memory also comprises persistent storage, which, for example, can be any single one or combination of magnetic memory, optical memory, or solid state memory or even remotely mounted memory, which can also be used as a storage device to store face data.

An input/output interface 64 is provided to allow the end user video conference device 10 to interact with other components, such as the server 16 or other end user video conference devices, e.g. to set up or conduct a video conference. The I/O interface 64 can for example be a network interface such as an interface for wireless networks (e.g. any of the IEEE 801.11x standards) or wired networks (e.g. Ethernet). Alternatively or additionally, the I/O interface 64 can be an interface to a mobile (cellular) network.

A camera 12 is provided for capturing images that can be used in a video conference. The camera can be embedded in the end user video conference device 10 or external and connected to the end user video conference device 10.

A display 11 is provided in the end user video conference device to allow the user to view other participants of the video conference. Additionally, input devices (not shown) such as a keyboard and/or pointing device (e.g. mouse, track pad or touch screen) are provided to allow user input.

Figure 5A:
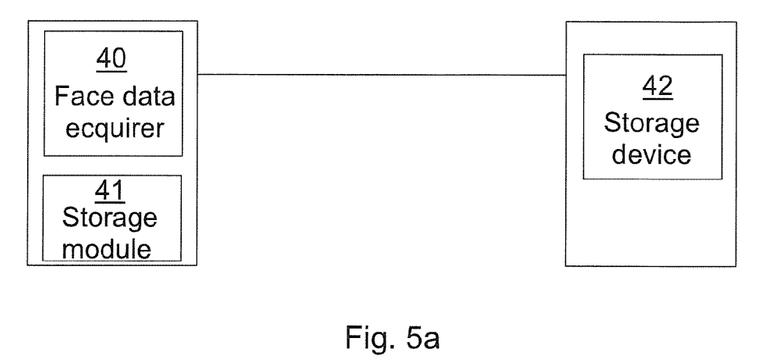

FIG. 5a is a schematic diagram showing a configuration for face data acquisition according to a first embodiment. In this embodiment, the face data acquirer 40 and the storage module 41 are comprised in the end user video conference device 10. The server 16 comprises the storage device 42, which stores the face data which the face data acquirer obtains. The decision whether to store or discard the face data is made in the storage module 41. This configuration allows the end user video conference device 10 to acquire face data, but the face data is stored centrally in the server 16 to allow access by more interested entities.

Figure 5B:
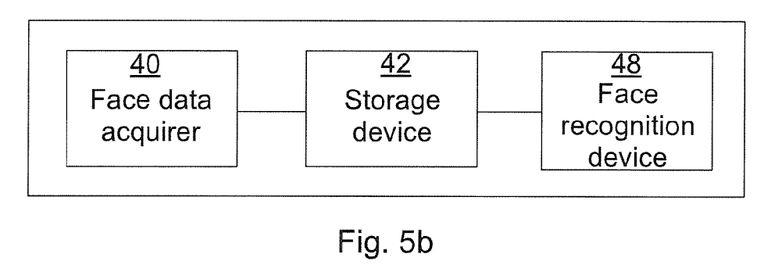

FIG. 5b is a schematic diagram showing a configuration for face data acquisition according to a second embodiment. In this embodiment, the face data acquirer 40 and the storage device 42 are both located in the server 16. This reduces the requirements on the end user video conference device to acquire images from the video stream of the video conference. Optionally, the face data acquirer 40 can be delegated by the server 16 to another node in the network which is involved in the video conference, such as an intermediate video conferencing routing node between end user video conference devices 10a-c.

Furthermore, the server 16 comprises an optional face recognition device 48. This can be used to identify someone from a captured image of an unidentified face.

Figure 5C:
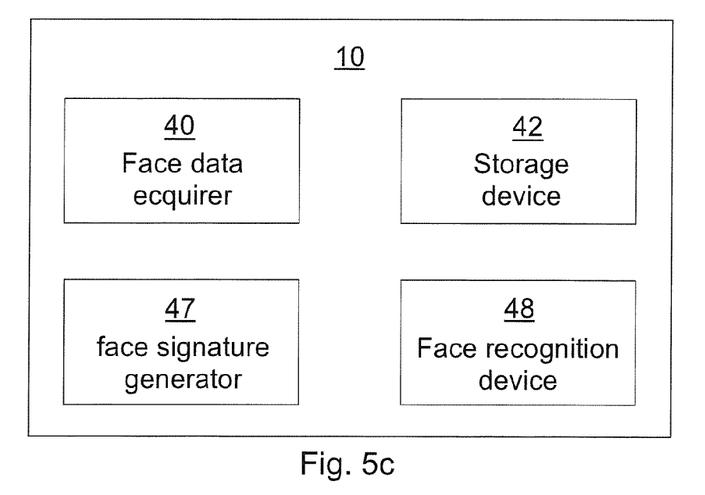

FIG. 5c is a schematic diagram showing a configuration for face data acquisition according to a third embodiment. In this embodiment, the end user video conference device 10 comprises both the face data acquirer 40 and the storage device 42. This implies that the end user video conference device 10 has local access to the face data for later face recognition by the optional face recognition device 48.

Furthermore, the end user video conference device optionally comprises a face signature generator 47. The face signature generator 47 is arranged to generate a face signature for the identity using the extracted face data in the storage device 42. The face signature is a set of data being sufficient to allow a face recognition device to recognise a face coupled to the identity in a face recognition image. This requires a sufficient number of sets of face data for the identity to generate the signature for. This signature can for example be attached to e-mails to facilitate face recognition by third parties. If several files are make up the signature, the files can be combined in the signature, e.g. by concatenation and/or compression.

Figure 6:
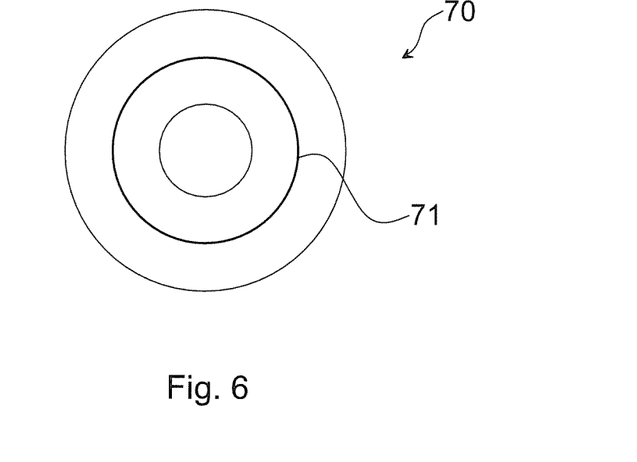
FIG. 6 shows one example of a computer program product comprising computer readable means.

FIG. 6 shows one example of a computer program product 70 comprising computer readable means. On this computer readable means a computer program 71 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as memory 62 of the end user video conference device 10 or memory 17 of the server 16. While the computer program 71 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

REFERENCES

[1] Viola, Jones: Robust Real-time Object Detection, IJCV 2001
[2] T. F. Cootes, G. J. Edwards, and C. J. Taylor. Active appearance models. ECCV, 2:484-498, 1998

The invention claimed is:

1. A face data acquirer device comprising:
a controller; and
at least one memory coupled to the controller and comprising computer readable program code embodied in the at least one memory that when executed by the controller causes the controller to perform operations comprising:
capturing an image from a video stream of a video conference;
determining a subset of the image that represents a face;
acquiring an identity of a video conference participant coupled to the face represented by the subset of the image;
extracting face data from the subset of the image;
determining a first accuracy of face detection based on a set of previously stored extracted face data for the same identity without storing the extracted face data;
determining a second accuracy of face detection based on the extracted face data stored with the set of previously stored extracted face data for the same identity; and
determining to store the extracted face data with the set of previously stored extracted face data for the same identity in response to the second accuracy of face detection being higher than the first accuracy of face data.

2. The face data acquirer device according to claim 1, wherein the determining to store the extracted face data comprises determining to store the extracted face data in response to a measurement of difference of lighting or contrast conditions in the image compared to the set of previously stored extracted face data for the same identity being greater than a threshold value.

3. The face data acquirer device according to claim 1, wherein the determining to store the extracted face data comprises determining to store the extracted face data in response to a measurement of difference of lighting or contrast conditions in the subset of the image compared to the set of previously stored extracted face data for the same identity being greater than a threshold value.

4. The face data acquirer device according to claim 1, wherein the determining to store the extracted face data comprises determining to refrain from storing the extracted face data in response to determining that the face represented in the subset of the image is looking away from a camera used to obtain the image.

5. The face data acquirer device according to claim 1, wherein the determining to store the extracted face data comprises determining to refrain from storing the extracted face data in response to determining that the quality of the image is reduced due to packet losses.

6. An end user video conference device comprising the face data acquirer device according to claim 1.

7. The end user video conference device according to claim 6, comprising a storage module arranged to send a message to store the extracted face data in a storage device.

8. The end user video conference device according to claim 6, comprising a storage device arranged to store the extracted face data.

9. The end user video conference device according to claim 8, comprising a face recognition device arranged to determine an identity of a face represented in a face recognition image using the extracted face data stored in the storage device.

10. The end user video conference device according to claim 6, further comprising a face signature generator arranged to generate a face signature for the identity using the extracted face data in the storage device, wherein the face signature is a set of data being sufficient to allow a face recognition device to recognise a face coupled to the identity in a face recognition image.

11. A server comprising the face data acquirer device according to claim 1.

12. The server according to claim 11, wherein the server comprises a storage device for storing the extracted face data for subsequent face recognition.

13. The server according to claim 12, comprising a face recognition device arranged to determine an identity of a face represented in a face recognition image using the extracted face data stored in the storage device.

14. The face data acquirer device according to claim 1, wherein determining to store the extracted face data comprises determining not to store the extracted face data in response to a quantity of the set of previously stored extracted face data being greater than a threshold.

15. The face data acquirer device according to claim 1, wherein the determining the first accuracy comprises determining whether ones of the set of previously stored extracted face data are correctly recognized with the respective ones of the set of previously stored extracted face data removed from the set of previously stored extracted face data.

16. The face data acquirer device according to claim 15, wherein the determining the first accuracy comprises determining a percentage of ones of the set of previously stored extracted face data that are correctly recognized with the respective ones of the set of previously stored extracted face data removed from the set of previously stored extracted face data.

17. A method performed in a face data acquirer, the method comprising:
   capturing an image from a video stream of a video conference;
   determining a subset of the image that represents a face;
   acquiring an identity of a video conference participant coupled to the face represented by the subset of the image;
   extracting face data from the subset of the image;
   determining a first accuracy of face detection based on a set of previously stored extracted face data for the same identity without storing the extracted face data;
   determining a second accuracy of face detection based on the extracted face data stored with the set of previously stored extracted face data for the same identity; and
   determining to store the extracted face data with the set of previously stored extracted face data for the same identity in response to the second accuracy of face detection being higher than the first accuracy of face data.

18. The method according to claim 17, further comprising storing the extracted face data in a storage device.

19. The method according to claim 17, further comprising:
   determining an identity of a face represented in a face recognition image using the extracted face data stored in the storage device.

20. A non-transitory computer-readable storage medium comprising a computer program for a face acquisition device, the computer program comprising computer program code which, when run on the face acquisition device, causes the face acquisition device to perform the steps of:
   capturing an image from a video stream of a video conference;
   determining a subset of the image representing a face;
   acquiring an identity of a video conference participant coupled to the face represented by the subset of the image;
   extracting face data from the subset of the image;
   determining a first accuracy of face detection based on a set of previously stored extracted face data for the same identity without storing the extracted face data;
   determining a second accuracy of face detection based on the extracted face data stored with the set of previously stored extracted face data for the same identity; and
   storing the extracted face data for subsequent face recognition with the set of previously stored extracted face data for the same identity in response to the second accuracy of face detection being higher than the first accuracy of face data.

* * * * *

UNITED STATES PATENT AND TRADEMARK OFFICE
CERTIFICATE OF CORRECTION

Page 1 of 3

PATENT NO. : 8,965,067 B2
APPLICATION NO. : 13/824822
DATED : February 24, 2015
INVENTOR(S) : Frojdh et al.

It is certified that error appears in the above-identified patent and that said Letters Patent is hereby corrected as shown below:

Delete the title page and substitute therefor with the attached title page consisting of the corrected illustrative figure.

In the Drawings

Please replace FIG. 1 with FIG. 1 as shown on the attached pages.

In Fig. 2, Sheet 2 of 5, in Box "30", Line 2, delete "acquisiton?" and insert -- acquisition? --, therefor.

In Fig. 5a, Sheet 4 of 5, in Box "40", Line 2, delete "ecquirer" and insert -- acquirer --, therefor.

In Fig. 5c, Sheet 4 of 5, in Box "40", Line 2, delete "ecquirer" and insert -- acquirer --, therefor.

Signed and Sealed this
Twenty-first Day of June, 2016

Michelle K. Lee
*Director of the United States Patent and Trademark Office*

(12) United States Patent
Fröjdh et al.

(10) Patent No.: US 8,965,067 B2
(45) Date of Patent: Feb. 24, 2015

(54) FACE DATA ACQUIRER, END USER VIDEO CONFERENCE DEVICE, SERVER, METHOD, COMPUTER PROGRAM AND COMPUTER PROGRAM PRODUCT FOR EXTRACTING FACE DATA

(75) Inventors: Per Fröjdh, Stockholm (SE); Jacob Ström, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 86 days.

(21) Appl. No.: 13/824,822

(22) PCT Filed: Oct. 28, 2010

(86) PCT No.: PCT/SE2010/051174
§ 371 (c)(1),
(2), (4) Date: Mar. 18, 2013

(87) PCT Pub. No.: WO2012/057665
PCT Pub. Date: May 3, 2012

(65) Prior Publication Data
US 2013/0177219 A1 Jul. 11, 2013

(51) Int. Cl.
G06K 9/00 (2006.01)
G06F 17/30 (2006.01)
H04N 7/14 (2006.01)
H04N 7/15 (2006.01)
G06K 9/62 (2006.01)

(52) U.S. Cl.
CPC ...... *G06K 9/00268* (2013.01); *G06F 17/30793* (2013.01); *H04N 7/147* (2013.01); *H04N 7/15* (2013.01); *G06K 9/00926* (2013.01); *G06K 9/6255* (2013.01)

USPC .......................................................... 382/118

(58) Field of Classification Search
None
See application file for complete search history.

(56) References Cited

U.S. PATENT DOCUMENTS

| | | | |
|---|---|---|---|
| 7,539,556 B2 * | 5/2009 | Oohashi | 700/245 |
| 7,847,815 B2 * | 12/2010 | Patel et al. | 348/14.08 |
| 8,396,264 B2 * | 3/2013 | Moriyama et al. | 382/118 |
| 2006/0259755 A1 * | 11/2006 | Kenoyer | 713/1 |

(Continued)

FOREIGN PATENT DOCUMENTS

| | | |
|---|---|---|
| EP | 1998286 A1 | 12/2008 |
| WO | WO 2008/045153 A2 | 4/2008 |

OTHER PUBLICATIONS

International Search Report, PCT/SE2010/051174, Jun. 29, 2011.
Written Opinion of the International Searching Authority, PCT/SE2010/051174, Oct. 2, 2012.

(Continued)

*Primary Examiner* — Daniel Mariam
(74) *Attorney, Agent, or Firm* — Myers Bigel Sibley & Sajovec, P.A.

(57) ABSTRACT

A face data acquirer includes an image capture module arranged to capture an image from a video stream of a video conference. A face detection module is arranged to determine a subset of the image, the subset representing a face. An identity acquisition module is arranged to acquire an identity of a video conference participant coupled to the face represented by the subset of the image. A face extraction module is arranged to extract face data from the subset of the image and to determine whether to store the extracted face data for subsequent face recognition. A corresponding end user video conference device, server, method, computer program and computer program product are also provided.

20 Claims, 5 Drawing Sheets

Fig. 1